United States Patent [19]

Hashimoto et al.

[11] Patent Number: 4,825,236

[45] Date of Patent: Apr. 25, 1989

[54] SHUTTER FOR CAMERA

[75] Inventors: Teiji Hashimoto, Kanagawa; Fumio Shimada, Saitama; Fumio Mochida, Saigama, all of Japan

[73] Assignee: Canon Denshi Kabushiki Kaisha, Saitama, Japan

[21] Appl. No.: 10,399

[22] Filed: Feb. 3, 1987

[30] Foreign Application Priority Data

Feb. 4, 1986 [JP] Japan .................. 61-14071[U]

[51] Int. Cl.⁴ .............................................. G03B 9/40
[52] U.S. Cl. ................................................. 354/246
[58] Field of Search ............... 354/245, 246, 247, 248, 354/249

[56] References Cited

U.S. PATENT DOCUMENTS 2,283,533  5/1942  Brueske ..................... 354/246
4,401,380  8/1983  Sato et al. .................. 354/246

Primary Examiner—Michael L. Gellner
Attorney, Agent, or Firm—Toren, McGeady & Associates

[57] ABSTRACT

A shutter for a camera including a plurality of successively overlapping light shielding blades and a plurality of driving arms for holding and driving said blades to produce linked parallel movements of said blades, in which at least one hole is formed in at least one of said arms to reduce weight of the arms.

8 Claims, 2 Drawing Sheets

SHUTTER FOR CAMERA

BACKGROUND OF THE INVENTION

1. Field of the Invention

The present invention relates to a shutter for a camera and, more particularly, it relates to a shutter including a plurality of successively overlapping light shielding blades and a plurality of driving arms for holding and driving said light shielding blades to produce linked parallel movements of said light shielding blades.

2. Description of the Related Art

Heretofore, the light shielding blade of the shutter of this kind has been made of common steel plate or stainless steel plate, in order to assure high mechanical strength of the shutter blade, and an arm for holding and driving such a heavy shutter blade requires higher strength. As the result, it has been a common technical knowledge that a limit shutter speed is 1/1000 sec at maximum.

However, in order to assure synchronism of exposures at various portions of an object and to enlarge a photographing area, it has been required to move a shutter blade at a higher speed.

As a measure of increasing the speed of the shutter blade, it has been proposed to decrease the weight of the blade. Such proposals are disclosed for example, in U.S. Pat. Nos. 4,529,285 (patented: July 16, 1985), 4,298,265 (patented: Nov., 1981), 4,486,084 (patented: Dec. 4, 1984) and 4,401,380 (patented: Aug. 30, 1983). It has been also proposed to use a shutter blade of titanum plate instead of steel plate, forming depressions thereon by etching process and forming a surface hardened layer by nitriding treatment or the like, thereby decreasing the weight while increasing the strength of the shutter blade (for example, see Japanese Laid-Open Utility Model Application No. 54-173742, Japanese Laid-Open Patent Application No. 55-161223). It has been further proposed to use a plate of high-strength, anodized aluminum alloy (for example, see Japanese Laid-Open Patent Application No. 57-24925). These proposals enable to increase the shutter speed to 1/2000 sec., 1/4000 sec. or more.

According to the construction of the blade material now used, however, further increase of the blade speed to attain higher shutter speeds, such as 1/8000 sec., is very difficult by only decreasing the weight of the blades and it may be required to increase the blade winding-up energy by increasing the spring force for driving the blade or to increase the strength of the braking mechanism.

Under such circumstances, it has been also proposed to reduce the weight of the blade holding and driving arms also. In such viewpoint, it is possible to reduce the weight of the arm by making the arm of titanium plate, thinning said plate by etching process and then increasing the strength by nitriding process (see Japanese Laid-Open Patent Application No. 54-63823). Such a measure, however, tends to considerably increase the manufacturing cost of the shutter and it requires a large equipment to effect processing of factory wastes. Furthermore, the measure of reducing the weight of the arm only by thinning the arm gives rise to such disadvantages as the decrease of strength of the arm, the increase of wearing of the hole portion of pivotally supporting the blade and the like.

SUMMARY OF THE INVENTION

It is an object of the present invention to eliminate the disadvantages of the conventional constructions as described above and provide a shutter for a camera which operates in a smooth manner and which uses blade holding and driving arms for shutter blades which are reduced in weight, while retaining a required strength even if these arms are made of steel plates of low cost.

It is another object of the present invention to provide a shutter for a camera which can increase the shutter speed to enable X-contact synchronized photographing, without applying any modification to the braking mechanism now employed, and which enables the photographing at higher shutter speed up to 1/8000 sec. at a maximum.

DETAILED DESCRIPTION OF THE PREFERRED EMBODIMENT

Figure 1:
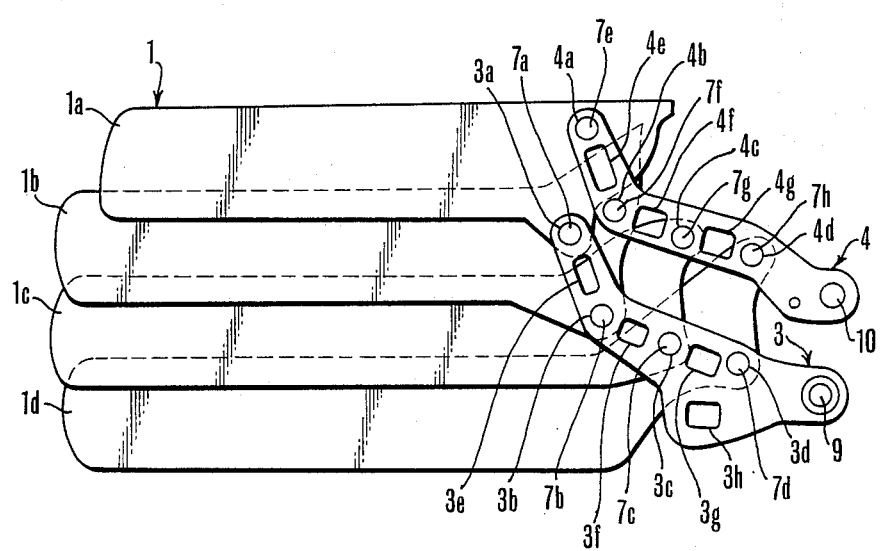
FIG. 1 is a plan view showing an embodiment of a leading blade of a shutter for a camera according to the present invention.

Now the preferred embodiment of the present invention will be explained, with reference to FIGS. 1, and 2.

A shutter blade, 1 forming a leading shutter blade consists of a plurality of opaque thin plates $1a$, $1b$, $1c$ and $1d$, while a shutter blade, 2, forming a trailing shutter blade consists of a plurality of opaque thin plates, $2a$, $2b$, $2c$ and $2d$. The thin plates, $1a$, $1b$, $1c$, $1d$ of the shutter blade 1 have dowel pins $7a$, $7b$, $7c$, $7d$ and $7e$, $7f$, $7g$, $7h$ fixed thereto by caulking, and these dowel pins are fitted in holes $3a$, $3b$, $3c$, $3d$ formed in an arm 3 made of steel plate, and holes $4a$, $4b$, $4c$, $4d$ formed in an arm 4 made of steel plate, respectively. In the same manner, the thin plates $2a$, $2b$, $2c$, $2d$ of the shutter blade 2 have dowel pins $8a$, $8b$, $8c$, $8d$ and $8e$, $8f$, $8g$, $8h$ fixed thereto by caulking, and these dowel pins are fitted in holes $5a$, $5b$, $5c$, $5d$ formed in an arm 5 made of steel plate, and holes $6a$, $6b$, $6c$, $6d$ formed in an arm 6 made of steel plate, respectively. These arms 3, 4, 5 and 6 are formed, at their parts between the above-mentioned holes, with square holes $3e$, $3f$, $3g$, $4e$, $4f$, $4g$, $5e$, $5f$, $5g$, $6e$, $6f$, $6g$, respectively, to reduce the weights of the respective arms. These arms 3, 4, 5 and 6 are pivotally mounted, at pivot axes 9, 10, 11 and 12, respectively, on a base plate 20.

Figure 2:
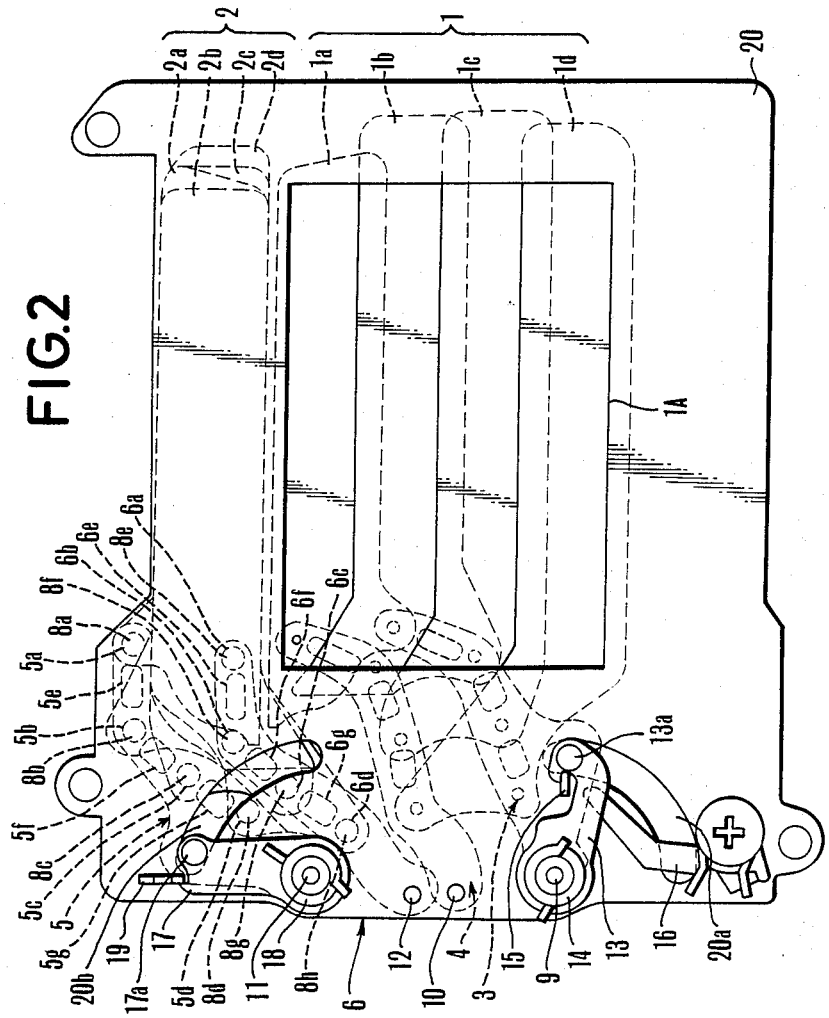
FIG. 2 is a plan view of the shutter including the leading blade shown in FIG. 1.

A driving lever 13 is fitted at one end of the pivotal axis 9 of said arm 3 and said lever 13 is energized by means of a spring 14 in clockwise direction, as viewed in FIG. 2. The driving lever 13 has a pin $13a$ fixed at its free end, which extends through an arcuate slot $20a$ formed in the base plate 20 and engages with a slot $3h$ formed in said arm 3, so that the arm 3 is driven when the lever 13 is rotated. The driving lever 13 is held in its charged position by means of a locking lever 15 which is associated with a shutter releasing system (not shown), so that the shutter blade is charged at its closed state. A braking piece 16 is arranged at one end of the arcuate slot $20a$ of said base plate 20, to apply a braking force to said driving lever 13.

A driving lever 17 is fitted to one end of the axis 11 of said arm 5 and said driving lever 17 is energized by means of a spring 18 in clockwise direction, as viewed in FIG. 2. The driving lever 17 has a pin $17a$ fixed at its free end, which extends through an arcuate slot 20b formed in the base plate 20 and engages with a slot (not shown) formed in said arm 5, so that said arm 5 is driven when the lever 17 is rotated. The driving lever 17 is held in its charged position by means of a locking lever 19 which is associated with a shutter actuating system (not shown), so that the shutter blade 2 is held in its opened position.

According to the construction as described above, the driving levers 13 and 17 are held in their charged positions by means of the locking levers 15 and 19, respectively, in the charged state, so that the shutter blade 1 forming the leading shutter blade is held in its closed position while the shutter blade 2 forming the trailing shutter blade is held in its oepend position.

When the locking lever 15 is unlocked by the shutter releasing operation, the driving lever 13 is rotated in a clockwise direction around the axis 9 under the action of the energizing force of the spring 14. The rotation of the lever 13 is transmitted through the pin 13a to the arm 3, thereby rotating the arm 3. Depending upon the rotation of the arm 3, the arm 4 is also rotated in clockwise direction around the axis 10, so that the plates 1a, 1b, 1c, 1d of the shutter blade 1 make parallel movements in downward direction, whereby an aperture 1A, which is arranged in opposed position to a film (not shown) in publicly known manner, is opened to start the exposure of the film.

After a predetermined time, the locking lever 19 is released. Then the driving lever 17 is rotated in clockwise direction around the axis 11 under the action of the energizing force of the spring 18. The rotation of the lever 17 is transmitted through the pin 17a to the arm 5, thereby rotating the arm 5. Depending upon the rotation of the arm 5, the arm 6 is also rotated in the clockwise direction around the axis 12, so that the plates 2a, 2b, 2c, 2d of the shutter blade 2 make parallel movements in downward direction, whereby the aperture 1A is closed to terminate the exposure of the film.

The arm 3, 4, 5 and 6 are formed with holes to reduce the weights of these arms, as explained above, and consequently the shutter blades 1 and 2 can be moved at very high speeds. As an example, the comparison tests were conducted to compare the shutter speed which could be attained by the construction in which the arms with weight reducing holes were used and that which could be attained by the construction in which the arms without weight reducing hole were used. In case where the longitudinal width of the aperture 1A was 24 mm, it was found that the running speed of the arm with weight reducing hole was faster, by 0.1-0.12 mm sec. than that of the arm without weight reducing hole.

In the above explained embodiment, the arms made of steel plate was used. The weight of these arms can be further reduced by making the arms of titanium or aluminum material. Although the weight reducing hole was explained as having a square shape in the above-described embodiment, the weight reducing hole may be formed in any other shape, depending upon the strength of the arm. For example, the hole may be circular in shape or may have a form having enlarged size in its base end portion and reduced size in its forward end portion.

In case where the shutter has a different construction from that of the above-described embodiment, in which only a main blade forming slits includes plates supported in linked parallel relation and an auxiliary blade is arranged to make rotary movement around an axis, the same advantage can be attained by forming their arms with weight reducing holes.

It will be understood that the present invention enables to reduce the weight of the blade arms, while holding the required strength thereof, at a low manufacturing cost, whereby the shutter speed can be considerably increased, without requring substantial increase of the driving energy.

What is claimed is:

1. A shutter apparatus comprising:
(a) a plurality of successively overlapping light shielding blades adapted to be disposed across a light path of an optical device;
(b) an axis; and
(c) an arm plate for driving said blades between a closing position in which said blades are extended to close said light path and an opening position in which said blades are retracted to open said light path, said arm plate being supported rotatably about said axis, and having a plurality of engaging portions engageable with a respective one of said blades and at least one hold provided between said engaging portions.

2. A shutter apparatus according to claim 1, wherein said arm plate is made of steel plate.

3. A shutter appearance for a camera, comprising:
(a) a plurality of successively overlapping light shielding blades adapted to be disposed across a light path of an optical device;
(b) axes; and
(c) arm plates for driving said blades between a closing position in which said blades are extended to close said light path and an opening position in which said blades are retracted to open said light path, each of said arm plates being supported about a respective one of said axes, and having a plurality of engaging portions engageable with a respective one of said blades and a plurality of holes provided between said engaging portions.

4. A shutter apparatus according to claim 3, wherein each of said arm plates is made of steel plate.

5. A shutter apparatus according to claim 3, wherein each of said arm plates is made of aluminum plate.

6. A shutter apparatus according to claim 3, wherein each of said arm plates is made of titanium plate.

7. A shutter apparatus according to claim 3, wherein said hole formed in the arm plate is square in shape.

8. A shutter apparatus according to claim 3, wherein said hole formed in the arm plate is circular in shape.

* * * * *